(12) United States Patent
Yoshida et al.

(10) Patent No.: US 8,629,208 B2
(45) Date of Patent: Jan. 14, 2014

(54) WATER-SOLUBLE FLUID FOR USE IN MACHINING OF RARE EARTH MAGNET

(75) Inventors: Mikio Yoshida, Echizen (JP); Shigeru Sakai, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 7 days.

(21) Appl. No.: 13/105,056

(22) Filed: May 11, 2011

(65) Prior Publication Data

US 2011/0281986 A1 Nov. 17, 2011

(30) Foreign Application Priority Data

May 12, 2010 (JP) ................................. 2010-109891

(51) Int. Cl.
*C08K 5/09* (2006.01)
*C08L 33/26* (2006.01)

(52) U.S. Cl.
USPC .......................................... 524/284; 524/555

(58) Field of Classification Search
None
See application file for complete search history.

(56) References Cited

U.S. PATENT DOCUMENTS

| 5,789,472 | A | 8/1998 | Ryan et al. |
| 7,255,750 | B2 * | 8/2007 | Cartwright et al. ............. 134/42 |
| 2004/0255924 | A1 | 12/2004 | Kondo et al. |

FOREIGN PATENT DOCUMENTS

| EP | 1331302 A1 | 7/2003 |
| JP | 1-223198 A | 9/1989 |
| JP | 3-84098 A | 4/1991 |
| JP | 8-20765 A | 1/1996 |
| JP | 2005-015617 A | 1/2005 |

OTHER PUBLICATIONS

European Search Report dated Aug. 10, 2011, issued in corresponding European Patent Application No. 11165526.2.
Database WIP; week 199238, Thomson Scientific, London, GB; AN1992-312572, XP002655151.
Japanese Office Action dated Oct. 29, 2013, issued in corresponding Japanese Patent Application No. 2010-109891 (2 pages).
English language translation of Japanese Office Action dated Oct. 29, 2013, issued in corresponding Japanese Patent Application No. 2010-109891.

* cited by examiner

*Primary Examiner* — Vu A Nguyen
(74) *Attorney, Agent, or Firm* — Westerman, Hattori, Daniels & Adrian, LLP

(57) ABSTRACT

A polymeric flocculant is added to an aqueous solution comprising an organic acid and a basic compound to form a water-soluble fluid suitable for use in machining of rare earth magnet.

6 Claims, No Drawings

WATER-SOLUBLE FLUID FOR USE IN MACHINING OF RARE EARTH MAGNET

CROSS-REFERENCE TO RELATED APPLICATION

This non-provisional application claims priority under 35 U.S.C. §119(a) on Patent Application No. 2010-109891 filed in Japan on May 12, 2010, the entire contents of which are hereby incorporated by reference.

TECHNICAL FIELD

This invention relates to a water-soluble fluid for use in machining of rare earth magnet. More particularly, it relates to a water-soluble fluid comprising an organic acid and a basic compound to which a polymeric flocculant is added for preventing the fluid from bubbling and clouding during its service in the machining of rare earth magnet for thereby improving the efficiency and accuracy of machining operation.

BACKGROUND ART

Rare earth magnet is manufactured by finely dividing an alloy or alloys based on rare earth metals and transition metals, followed by compaction and sintering. If desired, the sintered block is cut, ground or otherwise machined into a magnet product of the desired shape and dimensions. Since rare earth magnet can be oxidized at elevated temperature, with its properties degraded, the machining operation is carried out while cooling, typically using a machining fluid therefor.

The machining fluids are generally divided into two types, the fluid of water-insoluble type used as such for the main purpose of lubrication and the fluid of water-soluble type used after dilution with water for the main purpose of cooling. Nowadays, water-soluble fluids are most often used from the considerations of operation efficiency and fire hazard. In the machining of rare earth magnet, water-soluble fluids are used from the considerations of operation efficiency and safety because the constituent rare earth metals are susceptible to oxidation.

Even when machining is performed using a water-soluble fluid for cooling, chips are heated due to the heat generation associated with machining. The chips become so reactive at high temperature that they may be oxidized with water or airborne oxygen, forming the oxide and/or hydroxide of rare earth metal. While chips resulting from machining are generally separated from the water-soluble fluid by a settling or magnetic separation method utilizing the high specific gravity or magnetism of chips, such a method fails to separate particulate oxide and/or hydroxide. Particulates are kept suspended in the fluid while the fluid is circulated. Thus the fluid becomes turbid. Worse, particulates deposit on the surface of a workpiece, adversely affecting the quality of the workpiece. Also some particulate oxide and/or hydroxide can form a hydrophobic salt with an organic acid present in the machining fluid, which salt is taken into bubbles generated during the machining to increase the stability of bubbles. As a result, more bubbles are generated rather than being extinguished, and eventually overflow the machining system or fluid reservoir, substantially detracting from operation efficiency and safety.

It is believed that the problem is overcome by separating particulate oxide and/or hydroxide out of the system as soon as they are formed. If this is done by filtration using a pressure filter, the process becomes complex and the initial investment is increased. It would be most desirable if particulate oxide and/or hydroxide can be separated together with chips using a simple separator such as a settling separator or magnetic separator. Regrettably no effective method is currently available for such separation. In conjunction with the cutting and grinding of rare earth magnet using water-soluble fluid, no patent documents refer to the turbidity and bubble generation of the fluid. As long as the inventors know, there are available no patent documents to be incorporated herein by reference.

CITATION LIST

Patent Document 1: JP-A H08-020765

DISCLOSURE OF INVENTION

An object of the invention is to provide a water-soluble fluid comprising an organic acid and a basic compound which is minimized in bubbling and clouding during its service in the machining of rare earth magnet and thus effective for improving the efficiency and accuracy of machining operation.

The inventors have found that a water-soluble fluid comprising an organic acid and a basic compound is given antifoaming property by adding a polymeric flocculant thereto and that the polymeric flocculant is effective for preventing the fluid from bubbling and clouding during its service in the machining of rare earth magnet.

The invention provides a water-soluble fluid for use in machining of rare earth magnet, in the form of an aqueous solution comprising an organic acid, a basic compound, and a polymeric flocculant.

Preferably, the polymeric flocculant is a nonionic polymeric flocculant, more preferably a polyacrylamide polymeric flocculant. The polymeric flocculant is typically present in a concentration of 5 to 1,000 ppm.

The fluid is best suited for use in machining of neodymium-iron-boron magnet.

ADVANTAGEOUS EFFECTS OF INVENTION

Owing to the inclusion of a polymeric flocculant, the water-soluble fluid allows particulate oxide and/or hydroxide formed during machining to be agglomerated together and settled down along with metal chips. Then the particulates and chips can be separated from the fluid by a simple separator such as a settling separator or magnetic separator. The invention controls the generation of inextinguishable bubbles and clouding of the water-soluble fluid during machining of rare earth magnet for thereby improving the efficiency and accuracy of machining operation.

DESCRIPTION OF EMBODIMENTS

A water-soluble fluid comprising an organic acid and a basic compound is intended for use in machining of rare earth magnet. The water-soluble fluid according to the invention further comprises a polymeric flocculant.

Although the organic acid used in the water-soluble fluid is not particularly limited, carboxylic acids are preferred, and aliphatic carboxylic acids are more preferred. Of the aliphatic carboxylic acids, monobasic and dibasic acids are preferred. Suitable monobasic acids include octanoic acid, nonanoic acid and decanoic acid. Suitable dibasic acids include sebacic acid, dodecanedioic acid. These acids may be used alone or in admixture of two or more.

The organic acid is preferably present in a concentration of 1 to 5 g/L. A concentration of less than 1 g/L may render short the anti-rusting effect relative to the surface of rare earth magnet as machined. At a concentration in excess of 5 g/L, the organic acid is not completely dissolved in water and the excess may precipitate out. The precipitate may adversely affect the machining operation by clogging the nozzle for injecting the fluid.

The basic compound used in the water-soluble fluid may be either inorganic or organic. Suitable inorganic compounds include sodium hydroxide and potassium hydroxide. Suitable organic compounds include alkanolamines such as monoethanolamine, diethanolamine, and triethanolamine. Inter alia, triethanolamine is most preferred. The concentration of the basic compound is preferably equal to or more than the neutralization equivalent of the organic acid. If the concentration of the basic compound is below the neutralization equivalent, the organic acid may be difficultly dissolved in water and precipitate out. Specifically, the concentration of the basic compound is 1.0 to 3.0 times, more specifically 1.2 to 2.0 times the neutralization equivalent of the organic acid.

The polymeric flocculant used in the water-soluble fluid may be selected from anionic, cationic, nonionic and ampholytic high-molecular-weight compounds. Suitable anionic polymeric flocculants include acrylamide/sodium acrylate copolymers and acrylamide/sodium acrylamido-2-methylpropanesulfonate copolymers. Suitable cationic polymeric flocculants include alkylaminomethacrylate quaternary salt polymers, alkylaminoacrylate quaternary salt/acrylamide copolymers, and polyamidine hydrochloride. Suitable nonionic polymeric flocculants include polyacrylamide base polymeric flocculants. Suitable ampholytic polymeric flocculants include acrylamide/acrylic acid/alkylamino(meth)acrylate quaternary salt copolymers. Of these, the nonionic polymeric flocculants are preferred, with the polyacrylamide base polymeric flocculants being more preferred.

When a polyacrylamide base polymeric flocculant is used as the flocculant, it preferably has an average molecular weight of $6\times10^6$ to $12\times10^6$, more preferably $8\times10^6$ to $10\times10^6$ as measured by gel permeation chromatography (GPC) versus polystyrene standards. A flocculant with a molecular weight of less than $6\times10^6$ may have a less flocculating ability. A flocculant with a molecular weight of more than $12\times10^6$ may be less soluble in the water-soluble fluid. The polyacrylamide base polymeric flocculant is commercially available, for example, under the trade name of Sanfloc from Sanyo Chemical Industries, Ltd.

The polymeric flocculant is preferably present in a concentration of 5 to 1,000 ppm, more preferably 10 to 500 ppm, based on the weight of the water-soluble fluid. A concentration of less than 5 ppm may fail to achieve the desired effect of controlling foaming and clouding. At a concentration in excess of 1,000 ppm, no further improvement in the effect may be obtained, and a corresponding increase in fluid viscosity may adversely affect the machining operation.

In the water-soluble fluid, a base oil, defoamer, and other additives such as an extreme-pressure additive, anticorrosive, antioxidant and colorant may be added, if desired. These additives may be used in any desired amounts as long as the benefits of the invention are not impaired.

The water-soluble fluid is especially suited for use in machining of neodymium-iron-boron magnet blocks.

EXAMPLE

Examples of the invention are given below by way of illustration and not by way of limitation.

Examples 1 to 3 and Comparative Examples 1 and 2

Preparation of Test Fluid

Test fluids (Examples 1 to 3) were prepared by adding an amount (in Table 1) of a polymeric flocculant to an aqueous solution containing 2 g/L of dodecanedioic acid and 10 g/L of triethanolamine. Comparative Example 1 is the aqueous solution of dodecanedioic acid and triethanolamine. Comparative Example 2 is a commercially available water-soluble fluid (Finecut 902S by Neos Co., Ltd.). The following polymeric flocculants were used in Examples 1 to 3.

Nonionic Polymeric Flocculant: Sanfloc N-500P
(polyacrylamide, molecular weight $10\times10^6$), Sanyo Chemical Industries, Ltd.

Cationic Polymeric Flocculant: Sanfloc C-009P
(alkylaminomethacrylate quaternary salt polymer, molecular weight $2\times10^6$), Sanyo Chemical Industries, Ltd.

Bubbling/Turbidity Evaluation (1) Test Method

A 100-mL bottle was charged with 50 mL of the test fluid and 5 g of machined chips of neodymium-iron-boron magnet, which were shaken for 30 minutes and allowed to stand for a certain period.

(2) Evaluation

After the fluid was held for 5 minutes and 1 hour, bubbles on the liquid surface and the turbidity of the liquid phase were visually inspected. The results are shown in Table 1. The fluid was evaluated according to the following criterion.

◯: no bubbles, not turbid
Δ: some bubbles, some turbid
x: many bubbles, heavily turbid

TABLE 1

|  |  | Example | | | Comparative Example | |
|---|---|---|---|---|---|---|
|  |  | 1 | 2 | 3 | 1 | 2 |
| Polymeric flocculant (ppm) | N-500P | 100 | 5 | 0 | 0 | — |
|  | C-009P | 0 | 0 | 100 | 0 | — |
| After 5 min | Bubbling | ◯ | Δ | Δ | X | X |
|  | Turbidity | ◯ | Δ | Δ | X | X |
| After 1 hr | Bubbling | ◯ | ◯ | ◯ | X | X |
|  | Turbidity | ◯ | ◯ | ◯ | X | X |

It is demonstrated that the water-soluble fluids of Examples 1 to 3 are effective for controlling bubbling and clouding and thus suitable for use in machining of rare earth magnet blocks.

The polymeric flocculant is effective in preventing the water-soluble fluid from bubbling and clouding during its service in the machining of rare earth magnet for thereby improving the efficiency and accuracy of machining operation.

Japanese Patent Application No. 2010-109891 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A water-soluble fluid for use in machining of rare earth magnet, in the form of an aqueous solution comprising an organic acid, a basic compound, and a polymeric flocculant,
   wherein the organic acid is present in a concentration of 1 to 5 g/L and
   wherein the organic acid is selected from the group consisting of octanoic acid, nonanoic acid, decanoic acid, sebacic acid, and dodecanedioic acid.

2. The fluid of claim 1 wherein the polymeric flocculant is a nonionic polymeric flocculant.

3. The fluid of claim 2 wherein the nonionic polymeric flocculant is a polyacrylamide polymeric flocculant.

4. The fluid of claim 1 wherein the polymeric flocculant is present in a concentration of 5 to 1,000 ppm.

5. A method comprising machining a neodymium-iron-boron magnet, using the fluid of claim 1.

6. The fluid of claim 1 wherein the basic compound is present in a concentration of 1.0 to 3.0 times the neutralization equivalent of the organic acid.

* * * * *